US012479744B2

(12) United States Patent
Sun

(10) Patent No.: US 12,479,744 B2
(45) Date of Patent: Nov. 25, 2025

(54) SINGLE-HAND-OPERABLE MICRO WATER PURIFIER

(71) Applicant: DongGuan Diercon Technology Co., Ltd., Guangdong (CN)

(72) Inventor: Yinhuan Sun, Guangdong (CN)

(73) Assignee: DongGuan Diercon Technology Co., Ltd., Guangdong (CN)

( * ) Notice: Subject to any disclaimer, the term of this patent is extended or adjusted under 35 U.S.C. 154(b) by 473 days.

(21) Appl. No.: 17/879,290

(22) Filed: Aug. 2, 2022

(65) Prior Publication Data

US 2023/0055231 A1 Feb. 23, 2023

(30) Foreign Application Priority Data

Aug. 18, 2021 (CN) .......................... 202110948535.1

(51) Int. Cl.
| | |
|---|---|
| *C02F 1/44* | (2023.01) |
| *B01D 61/18* | (2006.01) |
| *B01D 63/02* | (2006.01) |
| *C02F 1/00* | (2023.01) |
| *C02F 1/28* | (2023.01) |

(52) U.S. Cl.
CPC .............. *C02F 1/444* (2013.01); *B01D 61/18* (2013.01); *C02F 1/001* (2013.01);
(Continued)

(58) Field of Classification Search
CPC .......... C02F 1/444; C02F 1/001; C02F 1/283; C02F 2201/005; C02F 2201/006;
(Continued)

(56) References Cited

U.S. PATENT DOCUMENTS

| | | | | | |
|---|---|---|---|---|---|
| 3,421,628 | A | * | 1/1969 | Barnabe et al. | ....... B01D 61/08 210/136 |
| 7,438,801 | B2 | * | 10/2008 | Scaringe | ................. C02F 1/441 210/321.83 |

(Continued)

FOREIGN PATENT DOCUMENTS

| | | | | | |
|---|---|---|---|---|---|
| CN | 107129066 | A | * | 9/2017 | ............... C02F 9/005 |
| CN | 107324605 | A | * | 11/2017 | ............... A45F 3/16 |

(Continued)

OTHER PUBLICATIONS

English Translation of CN-107129066 from PE2E Search database (Year: 2017).*

(Continued)

*Primary Examiner* — Terry K Cecil
(74) *Attorney, Agent, or Firm* — IP & T GROUP LLP

(57) ABSTRACT

The single-hand-operable micro water purifier of the present application relates to a micro water filter, especially a micro water purifier which can filter water by pressurization. It includes a micro filter device and a raw water pressurizing device. The micro filter device includes a filter cylinder body, a filter water inlet, and a filter water outlet and a filter material assembly located in the filter cylinder body. The raw water pressurizing device includes a pressurizing device water inlet, a pressurizing device main body, and a pressurizing device water outlet. The present application can promote the raw water to enter the filter device for performing the filtration to obtain the clean water, by using a single hand to operate, which not only brings convenience to the user, but also saves labor and improves the use efficiency.

7 Claims, 3 Drawing Sheets

(52) U.S. Cl.
CPC ...... *B01D 63/0241* (2022.08); *B01D 2311/04* (2013.01); *B01D 2313/18* (2013.01); *B01D 2313/24* (2013.01); *C02F 1/283* (2013.01); *C02F 2201/005* (2013.01); *C02F 2201/006* (2013.01); *C02F 2301/066* (2013.01)

(58) Field of Classification Search
CPC ................ C02F 2301/066; C02F 1/002; C02F 2201/002; B01D 61/18; B01D 63/0241; B01D 2311/04; B01D 2313/18; B01D 2313/24; B01D 2311/2626; B01D 2313/243
See application file for complete search history.

(56) References Cited

U.S. PATENT DOCUMENTS

| | | | |
|---|---|---|---|
| 9,302,919 B2 * | 4/2016 | Cheng | C02F 1/002 |
| 10,676,260 B2 * | 6/2020 | Merrigan | B65D 41/04 |

FOREIGN PATENT DOCUMENTS

| | | | | | |
|---|---|---|---|---|---|
| JP | H08229545 A | * | 1/2008 | ............ | C02F 1/0092 |
| KR | 20080008709 A | * | 1/2008 | .............. | C02F 1/002 |
| WO | WO-2019034879 A1 | * | 2/2019 | .............. | C02F 1/002 |

OTHER PUBLICATIONS

English Translation of JP H08229545 A from PE2E Search database (Year: 2008).*

English Translation of CN-JP H08229545 A from PE2E Search database (Year: 2008).*

English Translation of CN 107324605 A from PE2E Search database (Year: 2017).*

* cited by examiner

SINGLE-HAND-OPERABLE MICRO WATER PURIFIER

CROSS-REFERENCE TO RELATED APPLICATION

The present disclosure claims the priority to the Chinese patent application with the filing No. 202110948535.1 filed on Aug. 18, 2021 with the Chinese Patent Office, and entitled "Single-hand-operable Micro Water Purifier", the contents of which are incorporated herein by reference in entirety.

TECHNICAL FIELD

The single-hand-operable micro water purifier of the present application relates to a micro water filter, especially a micro water purifier which can filter water by means of pressuring.

BACKGROUND ART

The inventor previously invented a portable ultrafiltration water purifier, and applied for a utility model patent based on this, with the patent number of 201020119426.6 and the application date of 2010 Feb. 10 The technical solution is to use the manual pressure to make the piston generate the pulling force and thrust, so as to promote the raw water to enter the filter chamber for performing the filtration to obtain clean water. Since this type of water purifier is mainly used outdoor, needs to meet the requirements of portability, small size, and high water filtration efficiency. Therefore, this patent mainly obtains and achieves the following characteristics: simple structure, small size, durability, and easy to carry, and therefore it is widely used by consumers. However, the portable ultrafiltration water purifier also has a drawback and that is, the user is required to hold the housing of the water purifier with one hand and press or pull the push rod with the other hand to use it. This technical solution, which can be implemented only with participation of both hands, causes inconvenience to many users, which is especially true for outdoor travelers who wish to use one hand to do things as many as both hand, in order to free up one hand for other things.

At present, there is a micro portable water purifier abroad, which is connected with a rubber airbag, and generates a pulling force and a thrust through the rubber airbag, which promotes the raw water to enter the filter chamber for performing filtration to obtain clean water. Although this kind of portable ultrafiltration water purifier can be used by one hand, but it is inconvenient to be operated. The rubber airbag is soft, and thus the portable ultrafiltration water purifier connected to it is in a movable state, which makes the operation inconvenient. In addition, the power generated by this type of rubber airbag is often insufficient, and the water filtering efficiency of the filter is very low.

SUMMARY

The single-hand-operable micro water purifier of the present application overcome the above-mentioned defects of the prior art. Not only it meets the requirements of simple structure, small size, durability and portability, but also it can be operated with a single hand to make the raw water enter the filter chamber for performing filtration to obtain clean water. It is convenient to use, and at the same time, it is more labor-saving to operate, and the use efficiency is improved.

The technical solution adopted in the present application is as follows. The single-hand-operable micro water purifier is composed of a micro filter device 1 and a raw water pressurizing device 2, wherein the micro filter device 1 is composed of a filter cylinder body 11, a filter water inlet 12, a filter water outlet 14 and a filter material assembly 13 located in the filter cylinder body 1: and the raw water pressurizing device 2 is composed of a pressurizing device water inlet 21, a pressurizing device main body 22 and a pressurizing device water outlet 23, wherein the pressurizing device water outlet 23 is communicated with the filter water inlet 12, characterized in that the pressurizing device main body 22 comprises a piston device 221, a water inlet one-way valve device 222 located at a front end of the piston device 221, and a water outlet one-way valve device 223 located at a rear end of the piston device 221, the piston device 221 comprises a piston cylinder body 2211, a piston 2212, a sealing ring 2213 located between the piston cylinder body 2211 and the piston 2212, and a piston cylinder body end cover 2214, the piston cylinder body 2211 is provided with a piston water inlet 22111 and a piston water outlet 22112, a return spring 2215 is arranged between the piston 2212 and the piston cylinder body 2211, the piston 2212 has a piston push rod 22121 protruding out of the piston cylinder body end cover 2214, the water inlet one-way valve device 222 is communicated with the piston water inlet 22111, and the piston water outlet 22112 is communicated with the water outlet one-way valve device 223.

In the above single-hand-operable micro water purifier, the pressurizing device main body 22 further comprises a handle, which is connected with the piston push rod 22121.

In the above single-hand-operable micro water purifier, the handle is a cylindrical rod-type handle 224.

In the above single-hand-operable micro water purifier, the handle is a lever-type handle 225, which has one end hinged to the pressurizing device main body 22, and a middle portion of the lever-type handle 225 is in contact with the piston push rod 22121.

In the above single-hand-operable micro water purifier, the micro filter device 1 and the raw water pressurizing device 2 are two detachable parts, which are detachably fixedly hermetically connected with each other through the filter cylinder body 11 and the pressurizing device main body 22.

In the above single-hand-operable micro water purifier, the filter cylinder body 11 and the pressurizing device main body 22 are fixedly and hermetically connected with each other by screw threads.

In the above single-hand-operable micro water purifier, a connection sleeve 3 is arranged between the filter cylinder body 11 and the pressurizing device main body 22, the filter cylinder body 11 and the connection sleeve 3 are detachably fixedly hermetically connected with each other by screw threads; and the pressurizing device main body 22 and the connection sleeve 3 are hermetically fixedly connected with each other.

In the above single-hand-operable micro water purifier, a handle fixing hole 226 is provided at an upper end of the filter cylinder body 11.

In the above single-hand-operable micro water purifier, the water inlet one-way valve device 222 and the water outlet one-way valve device 223 are diaphragm-type one-way valve.

In the above single-hand-operable micro water purifier, the lever-type handle 225 is provided thereon with a torsion-spring-type connection buckle 2241.

Compared with the prior art, the present application has the following beneficial effects: by improving the structures of the piston cylinder and the handle, the force-bearing direction of pressing or pulling the piston is changed, and the force-bearing direction refers to the radial direction of the micro water purifier, such that the hand may be placed on the housing of the micro water purifier, as the gripping portion on which the force acts, thereby realizing the purpose of single-hand operation. In addition, because the lever-type handle is used to press the piston and it cooperates with the return spring in the piston, it is more labor-saving than the prior art, thereby improving the use efficiency.

DETAILED DESCRIPTION OF EMBODIMENTS

The present application will be further described below with reference to the embodiments and drawings.

Figure 1:
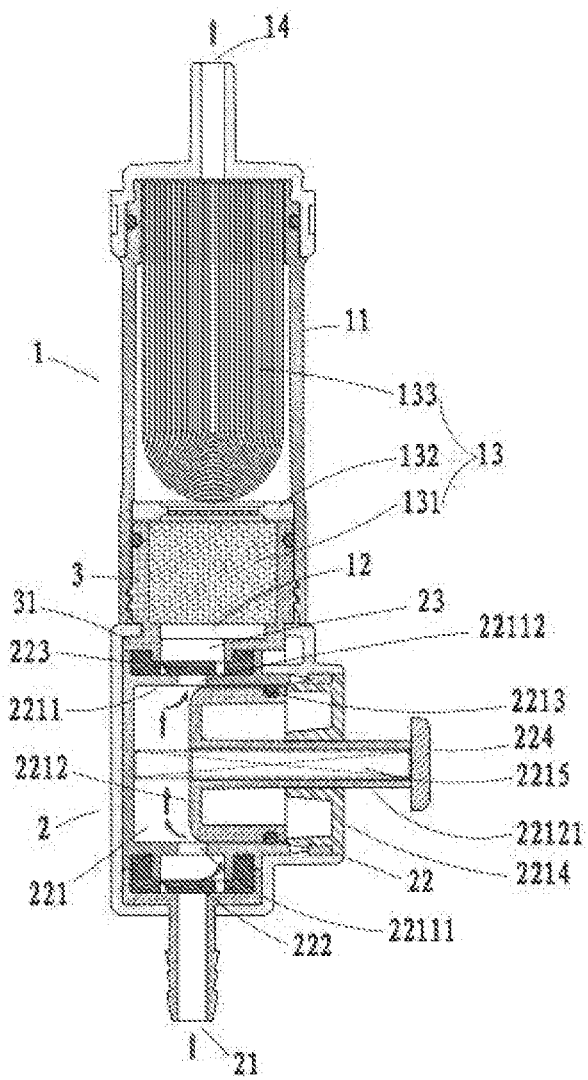
FIG. 1 is a schematic view of a longitudinal sectional structure of Embodiment 1 of single-hand-operable micro water purifier according to the present application.

FIG. 1 shows Embodiment 1 of the single-hand-operable micro water purifier according to the present application. This embodiment is composed of a micro filter device 1 and a raw water pressurizing device 2; the micro filter device 1 is composed of a filter cylinder body 11, a filter water inlet 12, a filter water outlet 14, and a filter material assembly 13 located in the filter cylinder body 1. The filter material assembly 13 is composed of a composite carbon fiber filter core 131, a filter disc 132, and an ultrafiltration membrane 133. The raw water pressurizing device 2 is composed of a pressurizing device water inlet 21, a pressurizing device main body 22, and a pressurizing device water outlet 23. The micro filter device 1 and the raw water pressurizing device 2 are two detachable parts, which are detachably fixedly hermetically connected with each other through the filter cylinder body 11 and the pressurizing device main body 22. In this embodiment, a connection sleeve 3 is provided between the filter cylinder body 11 and the pressurizing device main body 22. The filter cylinder body 11 and the connection sleeve 3 are detachably fixedly hermetically connected by screw threads. The connection sleeve 3 has a convex block 31, which is fixedly connected with the housing of the pressurizing device main body 22 in snapping manner. In this way, the micro filter device 1 can be easily disassembled, and the filter material assembly 13 can be replaced.

Of course, the filter cylinder body 11 and the pressurizing device main body 22 can also be fixedly and hermetically connected, directly through screw threads, which is also easily accomplished by those skilled in the art. The pressurizing device water outlet 23 communicates with the filter water inlet 12, and the raw water from the raw water pressurizing device 2 enters the micro filter device 1 through the filter water inlet 12. The pressurizing device main body 22 includes a piston device 221, a water inlet one-way valve device 222 located at the front end of the piston device 221, and a water outlet one-way valve device 223 located at the rear end of the piston device 221. In this embodiment, the water inlet one-way valve device 222 and the water outlet one-way valve device 223 are diaphragm-type one-way valves, which can fully reduce the volume of the entire micro filter device. Of course, according to the common sense of those skilled in the art, the duckbill one-way valve or ball one-way valve, etc. can also be used. The piston device 221 includes a piston cylinder body 2211, a piston 2212, a sealing ring 2213 located between the piston cylinder body 2211 and the piston 2212, and a piston cylinder body end cover 2214. The piston cylinder body 2211 is provided with a piston water inlet 22111 and a piston water outlet 22112. A return spring 2215 is provided between the piston 2212 and the piston cylinder body 2211. The piston 2212 has a piston push rod 22121 protruding out of the piston cylinder body end cover 2214. A cylindrical rod-type handle 224 is fixedly provided on the end of the piston push rod 22121. The cylindrical rod-type handle 224 is detachably movably connected with the piston push rod 22121, so as to facilitate carrying. Of course, the cylindrical rod-type handle 224 can also be a handle of other shapes, for the purpose of being convenient to carry and use. The water inlet one-way valve device 222 communicates with the piston water inlet 22111, and the piston water outlet 22112 communicates with the water outlet one-way valve device 223. In this way, by the pressing on the cylindrical rod-type handle 224 and the action of the return spring 2215, the pressurizing device main body 22 can make the raw water sucked from the pressurizing device water inlet 21 and pumped out from the pressurizing device water outlet 23 and then enter the micro filter device 1.

Figure 2:
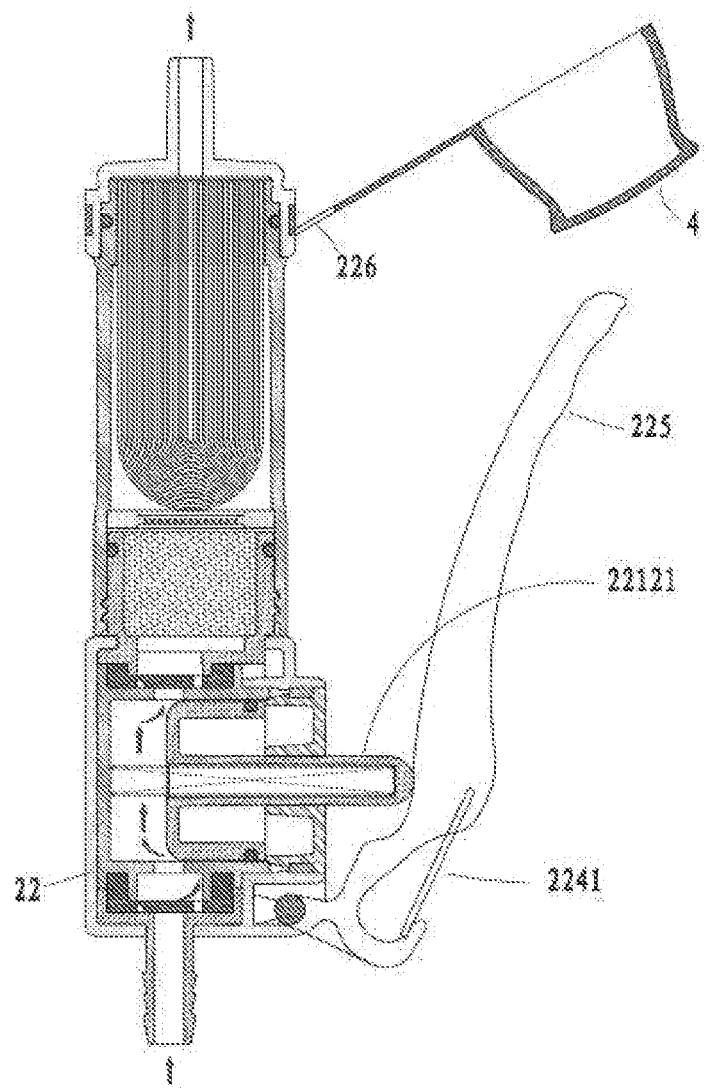
FIG. 2 is a schematic view of the longitudinal sectional structure of Embodiment 2 of single-hand-operable micro water purifier according to the present application.
Figure 3:
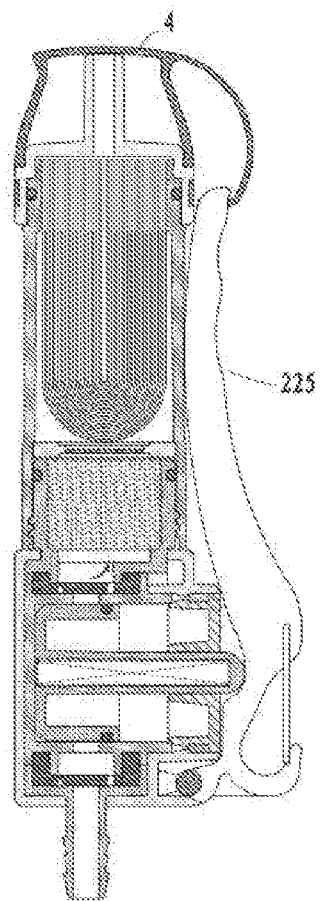
FIG. 3 is a schematic sectional structural view of the handle shown in FIG. 2 when the handle is fixed in the fixing hole.

As shown in FIG. 2 and FIG. 3, Embodiment 2 of the single-hand-operable micro water purifier according to the present application is shown. Different from Embodiment 1, a lever-type handle 225 is provided at the end of the piston push rod 22121. One end of the lever-type handle 225 is hinged on the pressuring device main body 22, and the middle portion of the lever-type handle 225 is in contact with the piston push rod 22121. Compared with Embodiment 1, the advantage of using the lever-type handle 225 is that it is less labor-intensive. The micro filter device 1 is also provided with an anti-dust cover 4, and a lever-type handle fixing hole 226 is provided in a tether attaching the cover 4 on the upper end of the filter cylinder body 11 for locking the lever-type handle 225 therein. The lever-type handle 225 is provided with a torsion-spring-type connection buckle 2241 to facilitate carrying.

The above are only preferred embodiments of the present application, and are not intended to limit the present invention. For those skilled in the art, the present application may have various modifications and changes. Any modifications, equivalent replacements, improvements, etc., made within the spirit and principle of the present application, shall be included within the scope of the claims of the present invention.

What is claimed is:

1. The single-hand-operable micro water purifier, which is composed of a micro filter device and a raw water pressurizing device, wherein the micro filter device is composed of a filter cylinder body, a filter water inlet, a filter water outlet, a filter material assembly located in the filter cylinder body, and a cover for capping the filter water outlet connected to the filter cylindrical body by a tether; and the raw water pressurizing device is composed of a pressurizing device water inlet, a pressurizing device main body and a pressurizing device water outlet, wherein the pressurizing device water outlet is communicated with the filter water inlet, wherein the pressurizing device main body comprises a piston device, a water inlet one-way valve device located at a front end of the piston device, and a water outlet one-way valve device located at a rear end of the piston device, the piston device comprises a piston cylinder body, a piston, a sealing ring located between the piston cylinder body and the piston, and a piston cylinder body end cover, the piston cylinder body is provided with a piston water inlet and a piston water outlet, a return spring is arranged between the piston and the piston cylinder body, the piston has a piston push rod protruding out of the piston cylinder body end cover, the water inlet one-way valve device is communicated with the piston water inlet, and the piston water outlet is communicated with the water outlet one-way valve device;

wherein the pressurizing device main body further comprises a handle, which is connected with the piston push rod, wherein the handle is a cylindrical rod-type handle, and wherein the handle is a lever-type handle, which has one end hinged to the pressurizing device main body, a middle portion of the lever-type handle is in contact with the piston push rod, and a second end of the handle is engageable within a handle fixing hole provided in the tether.

2. The single-hand-operable micro water purifier according to claim 1, wherein the micro filter device and the raw water pressurizing device are two detachable parts, which are detachably fixedly hermetically connected with each other through the filter cylinder body and the pressurizing device main body.

3. The single-hand-operable micro water purifier according to claim 2, wherein the filter cylinder body and the pressurizing device main body are fixedly hermetically connected with each other by screw threads.

4. The single-hand-operable micro water purifier according to claim 3, wherein the water inlet one-way valve device and the water outlet one-way valve device are diaphragm-type one-way valve.

5. The single-hand-operable micro water purifier according to claim 3, wherein a connection sleeve is arranged between the filter cylinder body and the pressurizing device main body, the filter cylinder body and the connection sleeve are detachably fixedly connected by the screw threads; and the pressurizing device main body and the connection sleeve are hermetically fixedly connected.

6. The single-hand-operable micro water purifier according to claim 5, wherein a handle fixing hole is provided at an upper end of the filter cylinder body.

7. The single-hand-operable micro water purifier according to claim 6, wherein the lever-type handle is provided thereon with a torsion-spring-type connection buckle.

\* \* \* \* \*